HARRY WARBURTON & HERBERT WARBURTON.
AUTOMATIC AIR GEAR SHIFTING DEVICE FOR AUTOMOBILES.
APPLICATION FILED MAR. 2, 1917.

1,284,834.

Patented Nov. 12, 1918.
8 SHEETS—SHEET 1.

Inventors:
Harry Warburton,
Herbert Warburton,
by their Attorneys.—
Howson & Howson

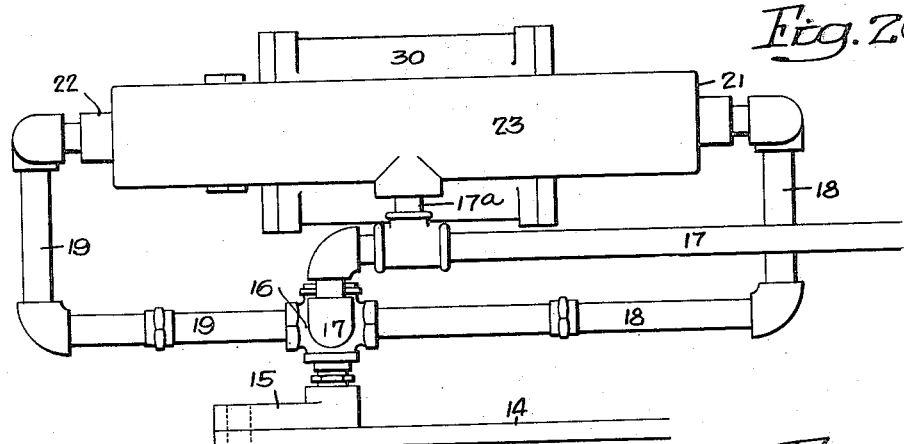
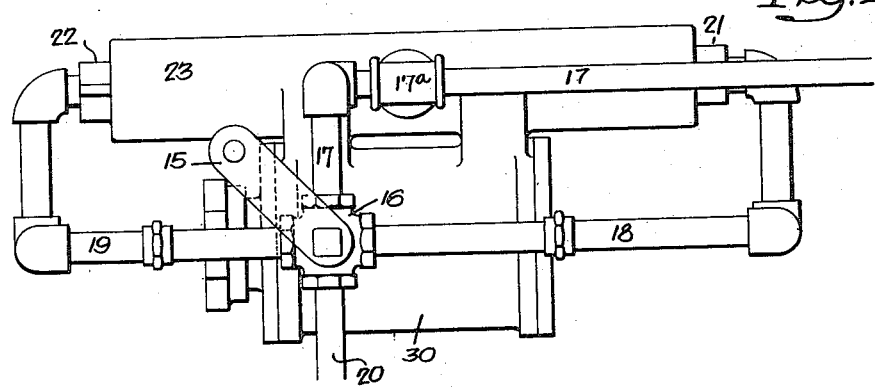
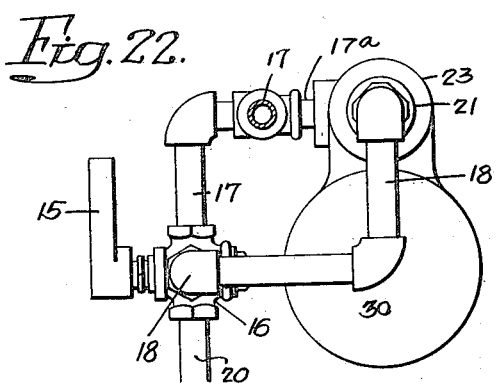
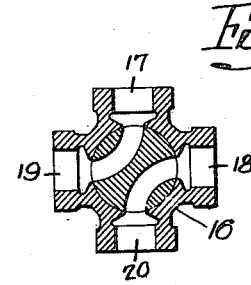

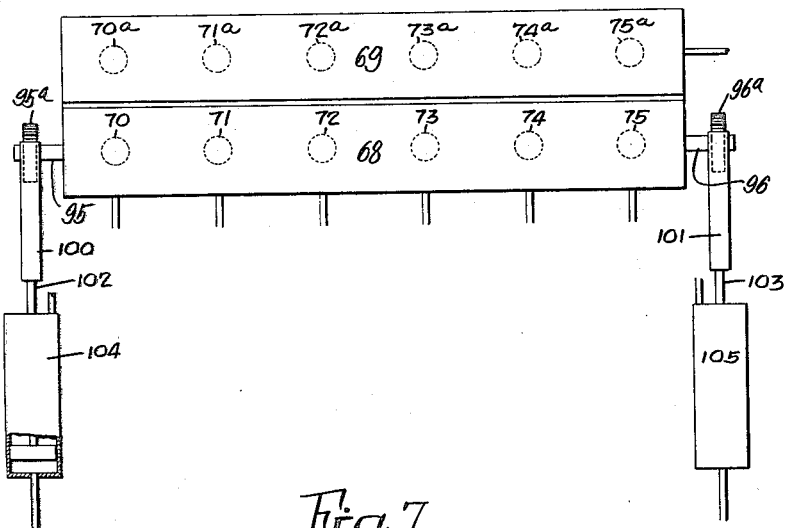
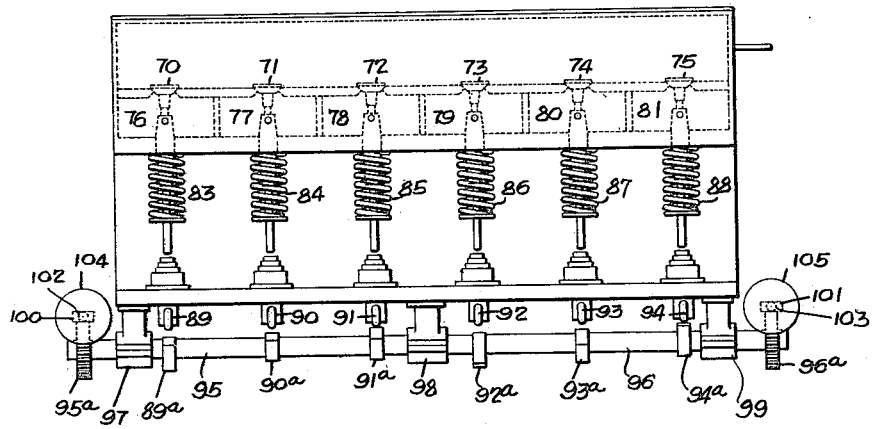
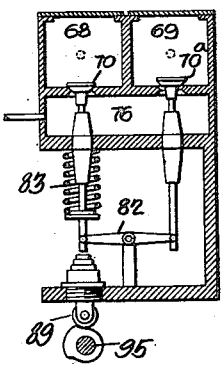

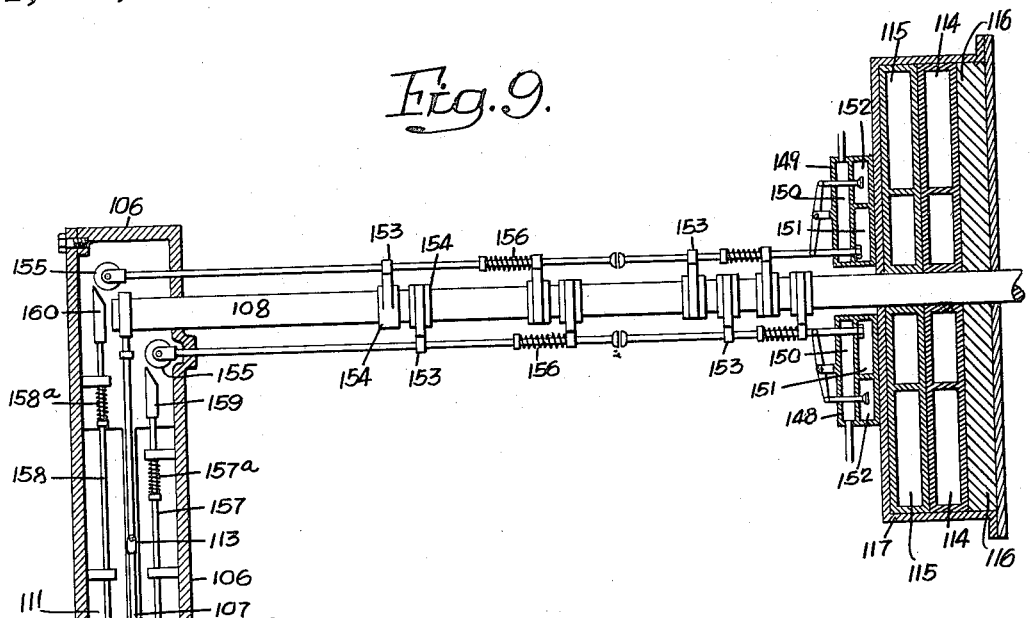

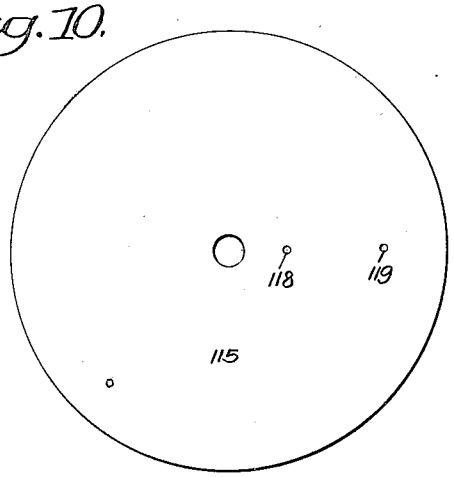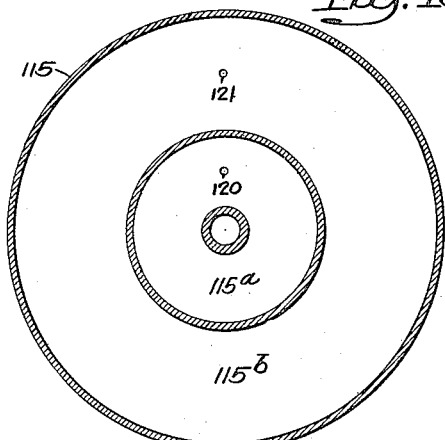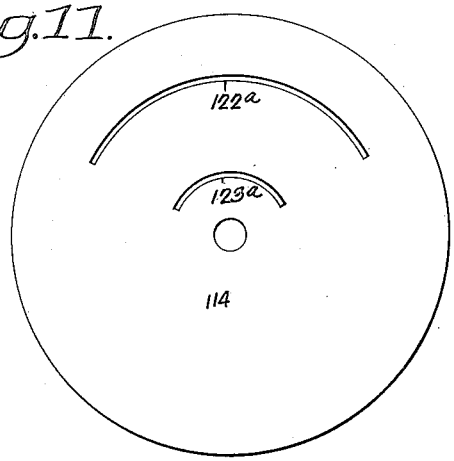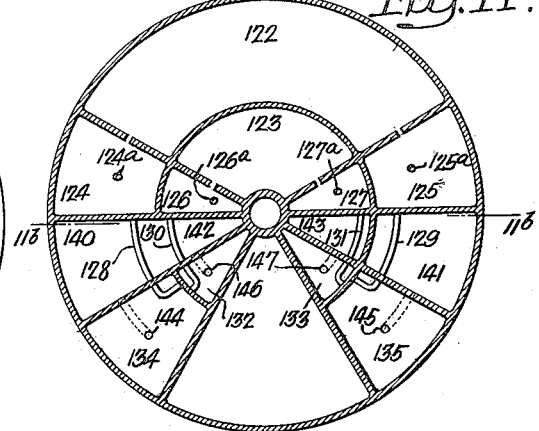

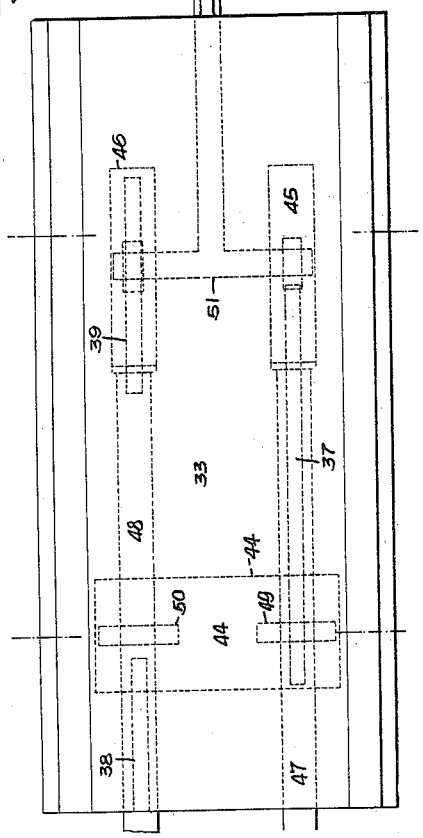

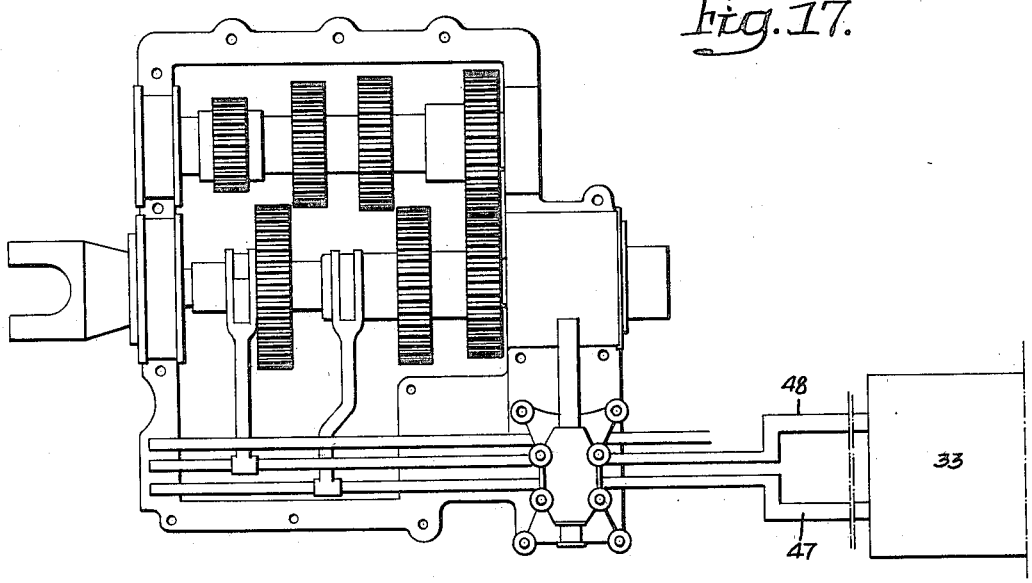
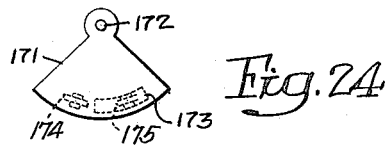
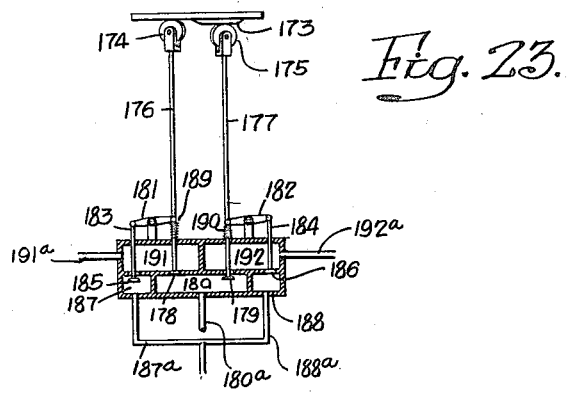

UNITED STATES PATENT OFFICE.

HARRY WARBURTON AND HERBERT WARBURTON, OF WILMINGTON, DELAWARE.

AUTOMATIC AIR GEAR-SHIFTING DEVICE FOR AUTOMOBILES.

1,284,834.            Specification of Letters Patent.      Patented Nov. 12, 1918.

Application filed March 2, 1917. Serial No. 151,970.

*To all whom it may concern:*

Be it known that we, HARRY WARBURTON and HERBERT WARBURTON, citizens of the United States, residing in Wilmington, Delaware, have invented Automatic Air Gear-Shifting Devices for Automobiles, of which the following is a specification.

Our invention relates to gear shifting devices for automobiles, and one object of our invention is to supply such a device that will operate automatically through the medium of compressed air; another object is to supply a gear shifting device that may be easily operated and that will be capable of adjustment whereby the rapidity of the actual shifting may be varied and the most efficient speeds obtained; a still further object is to supply such a device which may be applied to any gear, and in which the complete operation of shifting the gear including the operation of the clutch, may be accomplished by the movement of a single lever.

The device consists broadly of an apparatus for compressing air, operated from the motor of the automobile, mechanisms for selecting and shifting the gears, and for operating the clutch, said selecting, shifting and clutch mechanisms being operated by means of compressed air acting through a set of pistons and cylinders, and a device for controlling by hand the supply of air to the various cylinders.

In the accompanying drawings:

Fig. 4 is a view in section of the four way cock;

Fig. 6 is a plan view of the valve mechanism;

Fig. 7 is a view in front elevation of the valve mechanism;

Fig. 8 is a view in side elevation of the valve mechanism;

Fig. 9 is a view in section of the air control device;

Figs. 10, 11 and 12 are views in elevation of the disks of the control device showing the location of the various ports;

Figs. 10ª and 11ª are views in sectional elevation of the disks in Figs. 10 and 11, showing the arrangement of chambers therein;

Fig. 11ᵇ is a view in section taken on the line 11ᵇ—11ᵇ, Fig. 11ª.

Fig. 13 is a view in front elevation of the air control device with the lever casing in section;

Fig. 14 is an inverted plan view of the control lever casing;

Figs. 15 and 16 are views in section of the selecting mechanism showing the locking devices;

Fig. 17 is a view of the gears showing the connection between them and the shifting rods;

Fig. 18 is a plan view of the selecting and shifting mechanisms;

Fig. 19 is a view in side elevation of the selecting and shifting mechanisms;

Fig. 20 is a plan view of the pilot valve and cylinder of the compressing mechanism;

Fig. 21 is a view in front elevation of Fig. 20;

Fig. 22 is a view in side elevation of the same;

Fig. 23 is a view in sectional elevation of the separate reverse shift control;

Fig. 24 is a plan view of the cam plate 171, Fig. 23;

Fig. 25 is a plan view of the cam plate 194.

Figure 1:
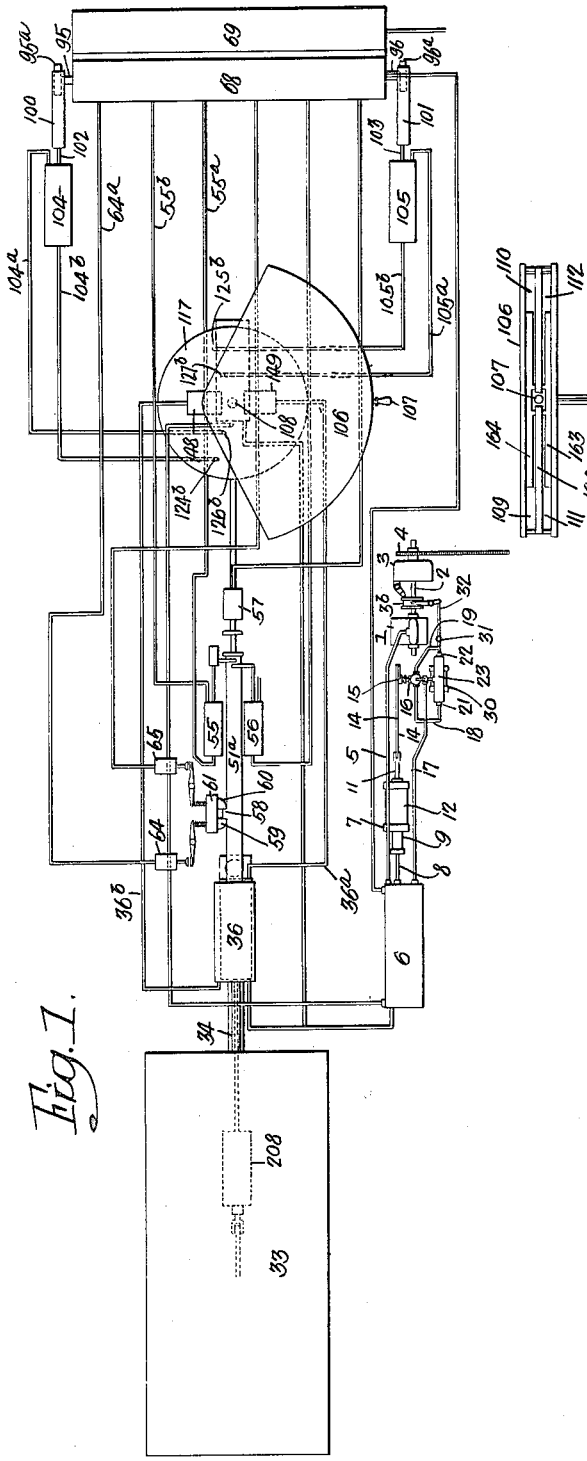
Figure 1 is a view showing the device assembled.

The air compressing device is shown in Fig. 1, and consists of an air pump 1, of any construction suitable to the conditions involved, mounted on a shaft 2, said shaft receiving its motion from the engine. Mounted loosely on the shaft 2 and free to rotate thereon is a clutch member 3, bearing, in the present instance, a sprocket wheel 4, by means of which, and a chain, motion is transmitted to the member from the engine. Any suitable arrangement, however, may be employed for the transmission of this motion. The clutch member 3 is hollow and has the usual cone shaped interior, operating in conjunction with a second clutch member 3ª, which is adapted to fit the interior of the member 3, the two members forming a friction clutch of the well known type. The member 3ª is fastened to the shaft 2 and is connected with a clutch collar 3ᵇ, which is keyed to the pump shaft 2 so that it rotates therewith but is free to move longitudinally along the shaft.

The connection between the member 3ª and the clutch collar 3ᵇ is such that as the collar is slid back and forth along the shaft it contracts or expands the internal clutch member 3ª which accordingly is forced into or out of frictional contact with the interior of the clutch member 3.

Figure 3:
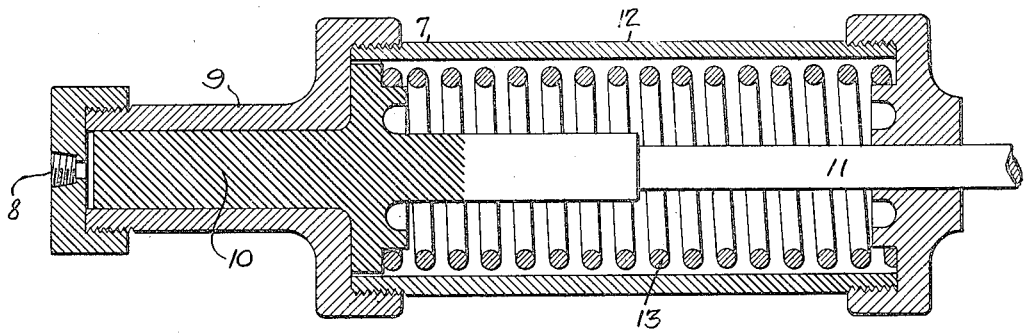
Fig. 3 is a view in section of a part of the air compressing mechanism.

From the pump 1, a pipe 5 leads to the air tank 6, said tank and pipe having capacities to suit the conditions. At 7 is shown a device for automatically regulating the pressure of the air in the tank. The details of this device are shown in Fig. 3. From the tank 6 a pipe 8 leads to a cylinder 9 in which is a piston 10 on the end of a rod 11. At the back of the cylinder 9 is a cylinder 12 which incloses a spring 13 around the rod 11, said spring being so arranged as to bear against the piston 10, thereby tending to force it forward into the cylinder 9 against the pressure of the air admitted to the cylinder from the tank through the pipe 8. A connecting rod 14 joins the rod 11 to a lever 15 on a four way plug cock 16. The details of the cock 16 are shown in Fig. 4 and are too familiar to require further description.

Figure 5:
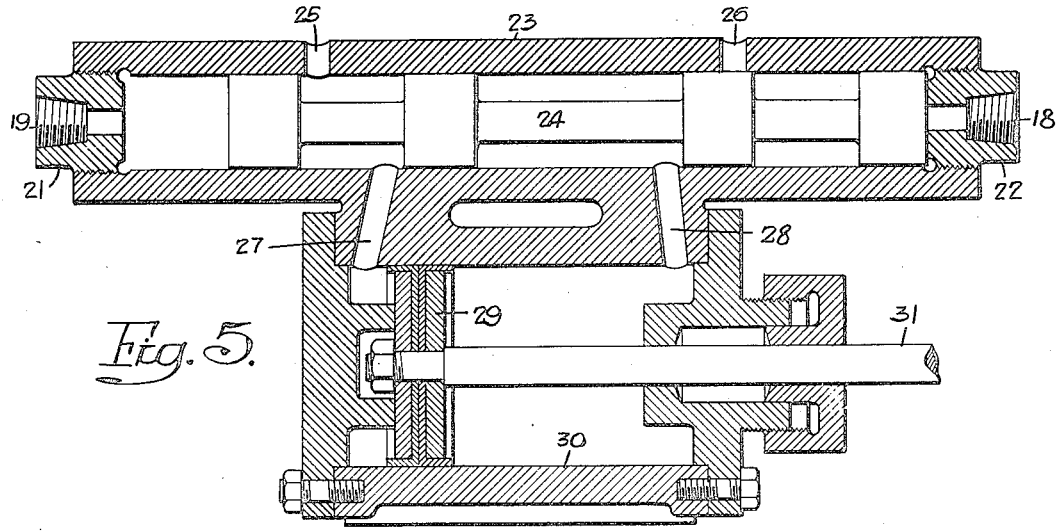
Fig. 5 is a view in section of the pilot valve and cylinder which governs the air compressor.

From the four way cock 16, pipes 17, 18, 19 and 20 lead respectively to the tank 6, to each end 21 and 22 of the pilot valve 23, and to the exhaust. The pipe 17 has a branch 17ª leading to the center of the valve. By moving the four way cock 16, air may be introduced from the tank 6 into either end of the pilot valve 23, the opposite end being opened at the same time to exhaust. The details of the pilot valve are shown in Fig. 5.

Within the valve casing 23 is a slide valve 24. In the casing are exhaust ports 25 and 26 and also the ports 27 and 28 leading to opposite sides of a piston 29 in a cylinder 30 situated below the valve. When the slide valve is forced to the right by the air entering at 21 through the pipe 19, the left hand end of the cylinder 30 will be open to exhaust through the ports 27 and 25, while air will be admitted to the right hand side of cylinder 30 through the pipe 17ª and the port 28, the exhaust port 26 being closed. The piston 29 will accordingly be forced to the left. If the clock 16 is reversed the slide valve 24 will be forced to the other side of its casing, thereby closing the exhaust 25 and port 26 and admitting air through port 27. The piston 29 will accordingly be forced in the opposite direction, or to the right. The piston 29 is connected through a piston rod 31 and a connecting rod 32 to the clutch collar 3ᵇ.

The operation of this device is as follows:
When the pressure in the tank falls below the pressure required, the spring 13 will force the piston 10 forward and open the four way cock 16 so that the pilot valve will be operated to admit air to the left hand side of cylinder 30. The piston 29 will be forced to the right and will carry the clutch collar 3ᵇ with it. This will cause an expansion of the clutch member 3ª so that frictional contact is made with the member 3 and the pump shaft 2 accordingly rotated. When the pressure in the tank has reached the required amount, the piston 10 will be forced back against the pressure of the spring 13 and the reverse operation of the mechanism will cause the clutch members to be released and the pump thrown out of operation.

The selecting and shifting mechanisms consist of the movable plate 33 suitably mounted and connected to the piston rod 34 of the piston 35 in the cylinder 36. The plate 33 carries on its underside the cam surfaces 37, 38 and 39 which contact with the rollers 40ª, 41ª, 42ª and 43ª carried by the adjustable pins 40, 41, 42 and 43 respectively. The pins 40 and 41 are mounted on the stationary plate 44 while 42 and 43 are mounted on the movable yokes 45 and 46 which have attached to them the rods 47 and 48 leading to the gears. The pins 40 and 41 are so mounted that normally they will be held in the position in which the pin 42 is shown in the drawing, the springs 49 and 50 holding them in the elevated position. In this position the rods 47 and 48 are free to move under the pins 40 and 41. When however the pins are depressed by the cams 37 or 38, as shown at 40, the lower end will enter a hole or depression in the rods 47 or 48 and lock them to the plate 44.

Sliding in the yokes 45 and 46 is the T shaped member 51, having a rearwardly extending arm 51ª. The pins 42 and 43, mounted on the yokes 45 and 46, are similar to the pins 40 and 41 in construction and operation, with the exception that they have two downwardly projecting points 42ᵇ, 42ᶜ and 43ᵇ, 43ᶜ. When these pins are depressed by the cams 37 and 39 these points will pass on either side of the cross piece 51 and so lock that member to the yoke, as shown by the position of the pin 43. When the rod 47 is locked to the plate 44 by the depression of the pin 40, the pin 42 will be elevated and the cross piece 51 permitted to slide freely in the yoke 45; but when the pin 40 is elevated and the rod 47 free to move, the pin 42 will be depressed and the cross piece 51 locked to the yoke 45, so that any movement of the rod 51ª will carry the yoke and the rod 47 with it. The same relation exists between the pins 41 and 43, the rod 48 and the yoke 46. The cams 37, 38 and 39 are so located on the plate 33 that wnen either of the rods 47 or 48 are locked and immovable, the other will be free to move in response to any movement of the cross piece 51.

The cross piece 51 receives its motion from the pistons 52, 53 and 54 in the cylinders 55, 56 and 57, which are adapted to move the arm or rod 51ª. The rod 51ª has a lug or raised portion 58 which normally is held between the retaining jaws 59 and 60 mounted on the block 61 and adapted to be raised separately by the action of the pistons 62 and 63 operating in the cylinders 64 and 65. The lifting action is transmitted from the pistons by means of the pivoted levers 66 and 67, the ends of which are attached to the piston rods and to the jaws respectively. Springs 68 and 69 tend to force the jaws to their low or locking positions. By the raising of either jaw, movement of the rod 51ª is permitted in one direction but not in the other.

The valve mechanism which controls the admission of air to the cylinders 55, 56, 57, 64 and 65 is shown in Figs. 6, 7 and 8. The air chamber 68 and the exhaust chamber 69 are common to all the valves 70, 71, 72, 73, 74 and 75, which admit air from the air chamber 68 to the chambers 76, 77, 78, 79, 80 and 81 and exhaust it therefrom. The valves are of double construction, each having two elements 70, 70ª; 71, 71ª, etc., seated respectively in the chambers 68 and 69, and each element having a downwardly extending stem passing through the chambers 76, 77, 78, 79, 80 and 81, the stems of each pair of elements being connected at their lower ends by a pivoted link 82. Springs 83, 84, 85, 86, 87 and 88 tend to hold the elements 70, 71, 72, 73, 74 and 75 on their seats and in this position the elements 70ª, 71ª, 72ª, 73ª, 74ª and 75ª will be held off their seats due to the pivoted link 82. The elements 70, 71, 72, 73, 74 and 75 carry at their extremities the rollers 89, 90, 91, 92, 93 and 94. Directly below the rollers are the shafts 95 and 96 carried in the bearings 97, 98 and 99 which are attached to the valve body. These shafts carry the eccentric cams 89ª, 90ª, 91ª and 92ª, 93ª, 94ª respectively, which are adapted to contact with the rollers 89, 90, 91, 92, 93 and 94 when the shafts are rotated, thereby raising the valve elements 70, 71, 72, 73, 74 and 75 from their seats and, at the same time, through the link 82, forcing the elements 70ª, 71ª, 72ª, 73ª, 74ª and 75ª onto their seats. Thus in one operation the exhausts from the chambers 76, 77, 78, 79, 80 and 81 are closed and air admitted thereto. These chambers are connected by pipes to the cylinders 55, 56, 57, 64 and 65, and as the shafts 95 and 96 are rotated, air is admitted to and exhausted from the cylinders at the proper instants. The shafts 95 and 96 carry at their outer ends the pinions 95ª and 96ª which mesh with the racks 100 and 101 carried on the piston rods 102 and 103 whose pistons reciprocate in the cylinders 104 and 105. The cylinder 104 controls the valve operation for shifting the gears for reverse and second speed, while the cylinder 105 controls the valve operation for the first and third speed shifts.

In Fig. 9 is shown the device for controlling the distribution of air to the various cylinders for any desired shift. In casing 106 is the hand lever 107 attached at its inner end to the rotatable shaft 108 which passes through the side wall of the casing. The casing 106 is of segmental form and has at its circumferential end the four slots 109, 110, 111 and 112, in which the lever 107 is adapted to slide, a pivoted joint 113 on the lever arm allowing for the side motion necessary for the lever to enter the slots from the neutral or central position in which it is shown in the drawings. The shaft 108 carries at its outer end a disk 114 which is housed in a casing 117 and which has on either side the stationary disks 115 and 116. The three disks form the controlling means for admitting and exhausting air to and from the cylinders 104 and 105. The disks are shown in detail in Figs. 10, 10ª, 11, 11ª, 11ᵇ and 12. The innermost disk 115 is hollow as shown and has two concentric chambers, 115ª and 115ᵇ, of which the inner chamber 115ª is the air chamber, while 115ᵇ is the exhaust chamber, the air entering 115ª through the port 118 and being exhausted from 115ᵇ through the port 119. The disk 115 has two ports, 120 and 121, in the side which abuts the disk 114, which ports lead respectively from the air and the exhaust chambers.

The disk 114 is also hollow and is divided into a number of segmental chambers. The chambers 122 and 123 have in their faces the slots 122ª and 123ª respectively, which lie directly beneath ports 120 and 121 in the disk 115 and through which air is admitted from chamber 115ª in the disk 115 to chamber 123 and is exhausted from chamber 122 into chamber 115ª of the disk 115. The slot 122ª passes through the dividing walls and forms connection between chamber 122 and chambers 124 and 125 on either side, while slot 123ª forms a similar connection between chamber 123 and chambers 126 and 127. Chambers 124, 125, 126 and 127 have leading therefrom the ports 124ª, 125ª, 126ª and 127ª on the side of the disk opposite the slots 122ª and 123ª. Pipes 128, 129, 130 and 131 lead from chambers 124, 125, 126 and 127 respectively, to chambers 132, 133, 134 and 135, in which are ports 144, 145, 146 and 147.

The disk 116 is of solid metal and has four ports 124ᵇ, 125ᵇ, 126ᵇ and 127ᵇ passing through it. These ports are on the same concentric circles as are the ports 124ª, 125ª, 126ª and 127ª and the ports 144, 145, 146 and 147.

Attached to the casing 117 are the valve units 148 and 149. These units are of construction similar to that previously described. Each has a general chamber 150, an air chamber 151 and an exhaust chamber 152. A valve is seated in each of the chambers 151 and 152, the two valve stems being connected by a pivoted lever so that as one valve is raised from its seat the other will be forced onto its seat. The stems of the valves in the air chambers 151 are extended along the shaft 108, being held in bearings 153 connected to the shaft bearings 154, and pass through the casing 106 as does the shaft itself. On their outer ends the stems carry the rollers 155. Springs 156 mounted on the stems tend to hold the air valves continually on their seats, the exhaust valves being open. Supported in suitable bearings in the casing 106 are the rods 157 and 158 which carry on their ends wedge shaped members 159 and 160, and on their opposite ends the rollers 161 and 162 which fit under the movable blocks 163 and 164 which have pockets or depressions, 165 and 166 to receive them. The springs 157$^a$ and 158$^a$ hold the rods 157 and 158 in the normal raised position shown. The blocks 163 and 164 have segmental members 167, 168 and 169, 170 extending on each side. The blocks are adapted to slide with the lever 107 and when their movement occurs, the rod 157 or 158, as the case may be, is depressed, due to the cam-like action of members 167, 168 or 169, 170 which move over the rollers As the rod is depressed the wedge 159 (or 160) will meet the roller 155 and force the air valve in the valve unit 148 or 149 to the open position, at the same time closing the exhaust valve. This admits air to one side of the cylinder 36 to which the valve units are connected.

The operation of the device is as follows: With the gears in the neutral position, the slotted ports 122$^a$ and 123$^a$ in the disk 114 are centrally located under the ports 121 and 120 in the disk 115, and the ports 124$^a$, 125$^a$, 126$^a$ and 127$^a$ in disk 114 are directly over the ports 124$^b$, 125$^b$, 126$^b$ and 127$^b$ in the disk 116. This position permits air to pass from compartment 115$^a$ in disk 115, through the slotted port 123$^a$ into compartments 123 and 126 and thence through ports 126$^a$ and 126$^b$ and through the pipe 104$^a$ to the cylinder 104 where it forces the piston back as shown in the drawing. The opposite end of the cylinder 104 exhausts through pipe 104$^b$, the ports 124$^b$ and 124$^a$ into chamber 124, thence through the slotted port 122$^a$ into chamber 122 and through the port 121 into chamber 115$^b$ in disk 115 from which it is exhausted through port 119. At the same time air is passing through slotted port 123$^a$ into chamber 127 in disk 114, and thence through ports 127$^a$ and 127$^b$ and pipe 105$^a$ into cylinder 105 where it forces the piston therein to the back or end of the cylinder. The back end of the cylinder 105 is exhausted through pipe 105$^b$, ports 125$^b$ and 125$^a$ into chamber 125, thence to chamber 122 through the slotted port 122$^a$ and through the port 121 into chamber 115$^b$ in disk 115, from which it is exhausted through port 119. It will be noticed that in this position the valve elements 70, 71, 72, 73, 74 and 75 are closed while the exhaust elements 70$^a$, 71$^a$, 72$^a$, 73$^a$, 74$^a$ and 75$^a$ are open which means that the cylinders 55, 56, 57, 64 and 65 are all open to exhaust. Similarly the cylinder 36 is open to exhaust through the valve units 148 and 149.

When it is desired to throw the gears to reverse, the lever 107 is pushed into slot 109, which causes the following operations to take place. As the lever 107 leaves the neutral position, the rod 157 will be depressed by the member 167. This will cause the wedge member 159 to contact with the roller 155, depressing it and the stem to which it is attached and thereby opening the air valve and closing the exhaust valve in the valve unit 148. This admits air to the cylinder 36 through the pipe 36$^a$, and forces the piston 35 to the position shown in the drawing. The opposite end of the cylinder 36 will be exhausted through the pipe 36$^b$ into the valve unit 149 which is open to exhaust. As the piston 35 moves forward it carries the plate 33 to the position in which the reverse shift is selected. In this position the cam 39 has passed over and is depressing pin 43, thereby locking the cross piece 51, still in neutral position, to the yoke 46, while the cam 38 has passed from above the pin 41 which thereupon has assumed its elevated or normal position and has released the rod 48 from plate 44. At the same time the cam 37 is depressing pin 40, thereby locking rod 47 to plate 44, while pin 42 has assumed the elevated position, leaving the cross piece 51 free to move in the yoke 45.

As the lever 107 is pushed to its extreme position in slot 109, the disk 114 is rotated until the port 144, in the air chamber 134, comes over the port 124$^b$ in disk 116, thereby admitting air through pipe 104$^b$ to the cylinder 104 and forcing the piston therein forward, the air exhausting from the opposite side of the cylinder through pipe 104$^a$ and ports 126$^b$ 146 into chamber 132 in disk 114. The piston carries with it the rack 100 which turns the pinion 95$^a$ and the shaft 95. The cams 89$^a$, 90$^a$, and 91$^a$ on shaft 95 will contact with roller 89, 90 and 91 on the stems 70, 71 and 72 thereby lifting the air valves from their seats and closing the exhaust valves 70$^a$, 71$^a$ and 72$^a$. The valve 72 is first raised, throwing air into pipe 55$^a$, the cam 91$^a$ then passing over in idle operation. Valve 71 is next raised, throwing air into pipe 55$^b$. Valve 70 is then opened, throwing air into pipe 64$^a$ and forcing the piston 62 in cylinder 64 forward, thereby raising the jaw 59 and leaving the rod 51ᵃ free to move. The air in pipe 55ᵇ then enters the cylinder 55 and forces the piston 52 forward thereby advancing the rod 51ᵃ and the cross piece 51 which is locked to the yoke 46. The yoke 46 and the rod 47 are consequently moved ahead which throws the reverse gears into operation. In bringing the gears back to neutral the lever 107 is thrown to its central position which rotates the disk 114 back to its original position in which 124ᵇ is thrown to exhaust and air admitted to 126ᵇ. This causes a reversal of the operations and returns all the parts to their original or neutral positions. Air is admitted to port 126ᵇ and thence to cylinder 104 through pipe 104ᵃ, which causes the pinion 95ᵃ and shaft 45 to be reversed, bringing into play, first the cam 89ᵃ and allowing valve 70 to close while opening valve 70ᵃ and exhausting cylinder 64; then cam 90ᵃ, allowing valve 71 to return to normal closed position and opening 71ᵃ to exhaust cylinder 55 through pipe 55ᵇ; then cam 91ᵃ, which permits valve 72 to close and 72ᵃ to open, thereby driving the raised portion 58 under the jaw 59 and locking rod 51ᵃ in the original neutral position.

In throwing the gears into first speed, the plate 33 assumes the same position as for reverse. The disk 114, however, is rotated in the opposite direction so that the ports 147 and 145 are brought into play which operate the valves 73, 74 and 75 and throw the rod 51ᵃ in the direction opposite to that used for the reverse shift.

When the gears are thrown into third speed, the following operations take place. As the lever 107 leaves the central position, passing into slot 112, the rod 158 is immediately depressed, thereby operating the valve unit 149 to admit air to cylinder 36 through pipe 36ᵇ, and forcing the piston 35 to the end of the cylinder. As the plate 33 moves with the piston 35, the cam 89 will pass from over the pin 43, allowing it to return to the elevated position and releasing the cross piece 51; the cam 90 will pass over the pin 41 and depress it, thereby locking rod 43 to plate 44; the cam 87 will pass over pin 42, depressing it and locking the crosspiece 51 to the yoke 45; and the same cam, 87, passing from over the pin 40, permits it to take the elevated position and releases the rod 47 from the plate 44.

As the lever 107 reaches the end of its travel in slot 112, ports 145 and 147 in disk 114 come directly over ports 125ᵇ and 127ᵇ in disk 116, which permits 127ᵇ to exhaust and directing air through 125ᵇ into pipe 105ᵇ and cylinder 105, thereby forcing the piston and the rack 101 forward. This will cause a rotation of the pinion 96ᵃ on shaft 96 and will operate the valves 73, 74 and 75 by means of the cams 92ᵃ, 93ᵃ and 94ᵃ. The cam 94ᵃ will first raise the air valve 75 and close the exhaust valve 75ᵃ, thereby directing air to cylinder 57, the piston 54 performing an idle reciprocation and returning to normal position when the cam leaves the roller on the rod 75. Cam 93ᵃ will then raise the air valve 74 and close the exhaust valve 74ᵃ, thereby directing air to cylinder 56. Cam 92ᵃ, operating slightly later than 93ᵃ, will then open air valve 73 and close exhaust valve 73ᵃ, thereby directing air to cylinder 65 and raising jaw 60, leaving the rod 51ᵃ free to move in a direction away from the plate 33, when propelled by piston 53 in the cylinder 56. The rod 51ᵃ will carry with it the yoke 45 and the rod 47, to which it is locked.

When lever 107 is returned to the neutral position the following operations take place. Disk 114 is rotated to bring ports 125ᵃ and 127ᵃ over ports 125ᵇ and 127ᵇ in disk 116, which throws air through pipe 105ᵃ into cylinder 105 and forces the piston therein to the end of the cylinder, the cylinder exhausting through pipe 105ᵇ and ports 125ᵇ and 125ᵃ, 122ᵃ, 121 and 119. In this operation the pinion 96ᵃ is rotated back to neutral position. Cam 92ᵃ, acting slightly in lead of cam 93ᵃ, allows 73 to drop to normal closed position and opens 73ᵃ, which permits cylinder 65 to exhaust and the jaw 60 to drop. Cam 93ᵃ allows 74 to close and opens 74ᵃ, exhausting cylinder 56. When this is done, cam 94ᵃ acts on air valve 75 to open it and to close the exhaust valve 75ᵃ, thereby directing air to cylinder 57 and forcing piston 54 forward. The movement of piston 54 forces the rod 51ᵃ forward and the projection 58 passing under the jaw 60 locks the rod 51ᵃ in neutral position. The cylinder 57 is then thrown to exhaust by further movement of the cam 94ᵃ and the piston is returned to neutral position by means of the spring 57ᶜ.

The position of the plate 33 is the same for the second speed selection as for third, but the direction of the movement of the rod 51ᵃ is reversed.

The apparatus thus far described is designed for three speeds forward and a reverse, but by giving reverse a separate apparatus and control and using the present reverse for a forward speed it is possible to have four forward speeds and the reverse. A control for separate reverse is shown in Fig. 23.

The segmental plate 171 is pivoted at 172 to any suitable supporting structure and carries the cam piece 173 which is adapted to pass over the rollers 174 and 175 on the ends of the elongated valve stems 176 and 177. The stems 176 and 177 are attached to the valves 178 and 179 seated in the air chamber 180 to which air is admitted from the tank through pipe 180ª. Connected to the stems 176 and 177 by means of pivoted links 181 and 182 are the stems 183 and 184 which have at their ends the exhaust valves 185 and 186 seated in the exhaust chambers 187 and 188. The springs 189 and 190 tend to hold the stems in the elevated position and the valves 178 and 179 on their seats. The valves 178 and 179 are so connected to the valves 185 and 186 that when the air valve is open the exhaust valve will be closed and vice versa. The pipes 187ª and 188ª lead from the exhaust chambers 187 and 188 respectively. The valves 179 and 186 admit and exhaust air to and from the chamber 192, from which the pipe 192ª leads to a cylinder, not shown, containing a piston connected to a rod leading to the gears. The valves 178 and 185 admit and exhaust air to and from the chamber 191 from which the pipe 191ª leads to the opposite end of the cylinder. Air may be admitted to either side of the piston as it is desired to throw the gear in or out. The operator turning the plate 171 will throw the cam 173 over either one of the rollers 174 or 175, and so operates one of the valve units and causes air to be thrown through pipe 189ª or 190ª, as the case may be, thereby forcing the piston to one end of the cylinder. As air is being admitted to one end of the cylinder through pipe 191ª or pipe 192ª, the air in the opposite end of the cylinder will be exhausted through the other pipe.

Figure 2:
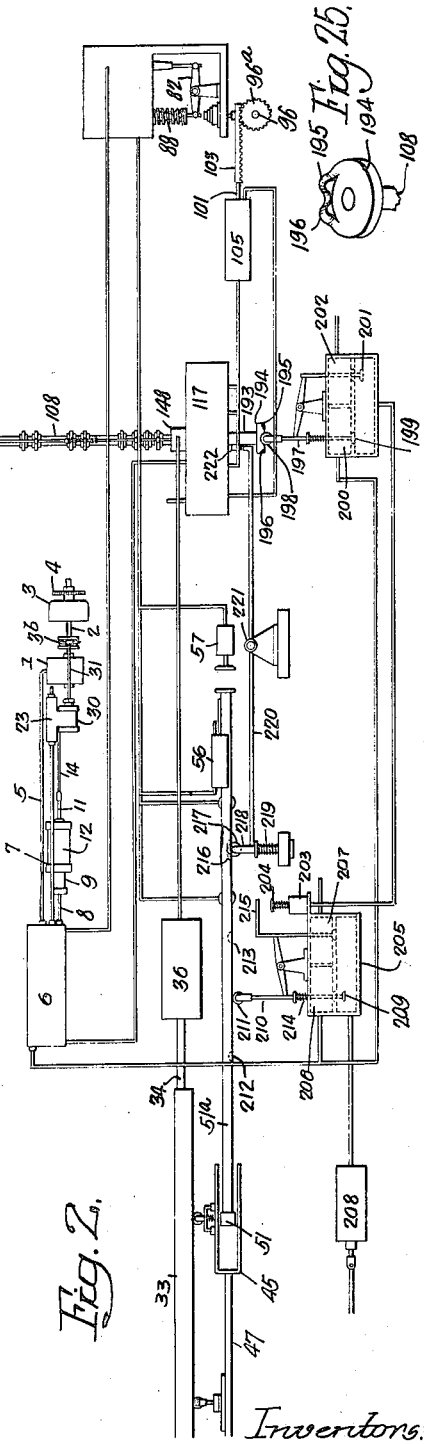
Fig. 2 is a view in side elevation of Fig. 1.

In Fig. 2 is shown a device whereby the clutch is automatically operated by compressed air, in conjunction with the other elements of the mechanism. The shaft 108 is continued through the casing 117 as shown at 193. The shaft carries at its end the cam plate 194 on which are the cams 195 and 196 which are adapted to depress the valve rod 197 by contact with the roller 198. The rod 197 is connected to the valve 199 seated in the air chamber 200 and has attached, in the manner previously described, the valve 201 adapted to seat in the exhaust chamber 202. This valve arrangement is similar to those already described and is adapted to direct air to and exhaust it from the cylinder 203, to operate a piston therein which carries the extension 204. The valve unit 205 has an air chamber 206 and an exhaust chamber 207 and is arranged to direct air into the cylinder 208 in which a piston operates to release the clutch. The air valve 209 has an elongated stem 210 bearing a roller 211 which contacts with the rod 51ª. The rod 51ª has two recesses, 212 and 213, into which the roller passes, the action being, that when the rod and the mechanism in general is in the neutral position, the air valve is open and the exhaust valve closed which holds the clutch released, but when the rod has moved to the position where the gears are in mesh, the roller drops into the recess 212 or 213, as the case may be, under pressure of the spring 214, thereby closing the air valve, opening the exhaust valve and permitting the clutch to move into engagement. When the lever 107, which is now in a shifting position in one of the slots 109, 110, 111 or 112, is moved back to neutral the stem 197 is immediately depressed by cam 195 or 196, and the piston in cylinder 203 is forced upward. The extension 204 contacts with the extension 215 on the exhaust valve stem, forcing the exhaust valve closed and the air valve open, and throwing the clutch out of engagement so that the gears may be unmeshed. When the neutral position is reached the roller 198 passes up into the recess between the cams, which opens the exhaust valve 201 and permits the cylinder 203 to exhaust; but since the rod 51ª is now holding the stem 210 depressed, the clutch still remains released. It will be seen that with this arrangement all possibility of stripping the gears is discounted.

The rod 51ª has in it a depression 216 in which, when the rod is in neutral position, the roller 217 rests. This roller is carried by the stem 218 and a spring 219 tends to hold the stem always in the elevated position. Attached to the stem is a rod 220 which is pivoted at 221 and passes over to a position beside the elongation 193 of the shaft 108. Carried by the shaft is a lug 222. When in neutral position the disposition of parts is as shown in the drawings, but when the rod 51ª passes from neutral position, due to the shifting of the lever 107, the stem 218 is depressed and the outer end of the rod 220 is forced into the path of the lug 222. When, therefore, the lever 107 is returned to the neutral position it cannot go beyond that position until the rod 51ª also returns to the neutral position. This arrangement makes the device practically fool proof.

By a change in the length of the movements of the shifting rod it is possible to arrange for any number of forward shifts and a reverse. The apparatus may be adjusted to work at any speed and the rapidity of the various movements may be made to vary. This may be accomplished by causing the piston controlling the movement which it is desired to retard to operate against spring pressure, while smaller feed pipes to the cylinders will have the same retarding effect.

We claim:

1. In a gear shifting device for automobiles, the combination with the gears of an air controlled shifting mechanism, an air controlled mechanism for connecting any gear to be shifted to the shifting mechanism; and means for directing the air for the operation of said connecting and shifting mechanisms.

2. In a gear shifting device for automobiles, the combination, with air compressing mechanism of an air controlled shifting mechanism, air controlled mechanism for connecting any gear to be shifted to the shifting mechanism, and means for directing the air from the compressing mechanism to the mechanisms for connecting and shifting the gears.

3. In a gear shifting device, an air operated shifting mechanism, air operated mechanism for connecting any gear to be shifted to the shifting mechanism, an air compressing mechanism, and a manually operated control device for directing the air from the compressing mechanism to said connecting and shifting mechanisms.

4. A gear shifting device for automobiles comprising air compressing mechanism, air operated gear shifting mechanism having an air controlled valve mechanism, air operated mechanism for connecting any gear to be shifted to the shifting mechanism, and manual means for controlling the admission of air to the entire system.

5. In a gear shifting device, in combination with air operated shifting mechanism, a connecting mechanism comprising rods connected to the gears, yokes on the ends of said rods, a shaft leading to said shifting mechanism and bearing a cross arm adapted to slide in said yokes, cam operated locking means for locking said cross arm to the yokes, and cam operated locking means for locking said rods in fixed position.

6. In a gear shifting device, in combination with air operated shifting mechanism, a connecting mechanism comprising rods connected to the gears, yokes on the ends of said rods, a shaft leading to said shifting mechanism and bearing a cross arm adapted to slide in said yokes, pins for locking said rods in fixed position, pins carried by the yokes for locking said cross arm to the yokes, said pins being normally in unlocked position, cams for forcing said pins to locking position, a cylinder, a piston attached to said cams and adapted to reciprocate in the cylinder, and means for directing compressed air to either end of the cylinder to cause reciprocation of said piston.

7. In a gear shifting device, in combination with a gear selecting mechanism, a shifting device comprising a movable shaft, means for connecting said shaft with the gears, a lug on said shaft, locking members adapted normally to abut the lug on opposite sides, air operated pistons for withdrawing said locking members, an air operated piston for shifting said shaft to a position on one side of the neutral position and returning it thereto, an air operated piston for shifting said shaft to a position on the opposite side of the neutral position, and an air operated piston for returning the shaft from the last named position to the neutral position.

8. In a gear shifting device, in combination with a shifting mechanism, a valve mechanism comprising air and exhaust chambers, valves seated in said chambers and having elongated stems, pivoted connections between said stems such that as one valve opens the other closes, springs holding one set of valves normally to their seats, rotating shafts, cams on said shafts adapted to contact with the stems of one set of valves to force said valves from their seats, pinions on said shafts, racks meshing with said pinions, said racks being carried by pistons adapted to reciprocate in their cylinders, and means for directing air to the cylinders to cause the pistons to reciprocate.

9. In a gear shifting device, a shifting mechanism comprising a plurality of cylinders having pistons adapted to reciprocate therein, a valve mechanism having a plurality of chambers connected with said cylinders, an exhaust chamber and an air chamber connected with each of said first named chambers, said air chambers being connected with a suitable source of air supply, valves interposed between the exhaust and air chambers and said first named chambers, the air valve being normally closed and the exhaust valve normally open, shafts adapted to rotate, cams on said shafts adapted to contact with one set of valve stems to open the valves, a pivoted connecting member between the air valves and the exhaust valves such that as one valve opens the other closes, and air operated and hand controlled means for rotating said cam shafts.

10. In a gear shifting device, an air operated selecting mechanism, an air operated shifting mechanism, valves controlling said shifting mechanism, mechanism for operating the valves, manually operated control mechanism comprising valves whereby air is directed to and exhausted from said selecting mechanism, and means for directing air to and exhausting it from the mechanism operating the valves which control said shifting mechanism.

11. In a gear shifting device, an air compressing mechanism, an air operating shifting mechanism, a valve mechanism controlling said shifting mechanism, pistons operating said valve mechanism, a control device for directing air to and exhausting air from the various mechanisms, said control device comprising a shaft, a chambered disk mounted on said shaft, a stationary disk on each side of said first named disk, said disks being adapted to direct air from said compressing mechanism to the pistons operating the valve mechanism.

12. In a gear shifting device, an air compressing mechanism, an air operated shifting mechanism, an air operated selecting mechanism, a control mechanism comprising valves for governing the admission of air to said selecting mechanism, a lever, and means connected to the lever for operating said valves.

13. In a gear shifting device, a manually operated control mechanism comprising a shaft adapted to rotate, a lever attached to said shaft, valves having elongated stems, wedge members adapted to contact with said stems for operating the valves, cam members connected with said lever for operating said wedge members, a chambered disk attached to said shaft, a stationary disk having an air chamber and an exhaust chamber, a stationary disk having ports therein, said disks being adapted to direct air to the various elements of the device and exhaust it therefrom.

14. In a gear shifting device, an air operated selecting mechanism, an air operated shifting mechanism, air operated clutch releasing mechanism, and means for directing air to the said mechanisms.

15. In a gear shifting device, in combination with air compressing means, air operated selecting and shifting mechanisms, air operated clutch releasing mechanism, and a manually operated control mechanism for directing air for the operation in proper succession of said selecting, shifting and clutch mechanisms.

16. In a gear shifting device, in combination with air operated gear selecting and shifting mechanisms and manual means for directing air thereto, a clutch operating mechanism comprising an air operated piston connected to the clutch, valve mechanism controlling the admission of air to said piston, operably connected to said shifting mechanism, and an operable connection between said valve mechanism and said means for directing air to the selecting and shifting mechanisms.

HARRY WARBURTON.
HERBERT WARBURTON.